US008732830B2

(12) United States Patent
Wibbeler (10) Patent No.: US 8,732,830 B2
(45) Date of Patent: *May 20, 2014

(54) SCRIPTING ENGINE EXTERNALIZED FUNCTION EXECUTION CONTROL

(75) Inventor: Patrick R. Wibbeler, Rocklin, CA (US)

(73) Assignee: Adobe Systems Incorporated, San Jose, CA (US)

( * ) Notice: Subject to any disclaimer, the term of this patent is extended or adjusted under 35 U.S.C. 154(b) by 772 days.

This patent is subject to a terminal disclaimer.

(21) Appl. No.: 12/473,591

(22) Filed: May 28, 2009

(65) Prior Publication Data
US 2014/0033276 A1    Jan. 30, 2014

(51) Int. Cl.
*G06F 7/04* (2006.01)
*G06F 11/00* (2006.01)
*H04L 29/06* (2006.01)

(52) U.S. Cl.
USPC ............... 726/23; 726/4; 726/30; 713/150; 713/152

(58) Field of Classification Search
USPC .................... 726/4, 23, 30; 713/150, 152
See application file for complete search history.

(56) References Cited

U.S. PATENT DOCUMENTS

| 5,974,549 | A | 10/1999 | Golan |
| 6,018,801 | A | 1/2000 | Palage et al. |
| 6,052,710 | A | 4/2000 | Saliba et al. |
| 6,289,446 | B1 * | 9/2001 | Nilsson ........................ 712/244 |
| 6,490,564 | B1 * | 12/2002 | Dodrill et al. ................ 704/275 |
| 7,200,599 | B2 | 4/2007 | Simon et al. |
| 7,305,659 | B2 * | 12/2007 | Muller et al. ................. 717/127 |
| 7,404,193 | B2 * | 7/2008 | Hen et al. ..................... 719/327 |
| 2008/0086778 | A1 * | 4/2008 | Asahara ........................ 726/26 |
| 2008/0148298 | A1 * | 6/2008 | Chatterjee et al. ........... 719/328 |
| 2008/0282345 | A1 * | 11/2008 | Beals ............................ 726/21 |
| 2009/0240928 | A1 * | 9/2009 | Fischer et al. ................ 712/226 |

OTHER PUBLICATIONS

"U.S. Appl. No. 12/434,492, Response filed Jul. 29, 2013 to Final Office Action mailed Apr. 29, 2013", 13 pgs.
"U.S. Appl. No. 12/434,492, Examiner Interview Summary mailed Jul. 11, 2013", 3 pgs.
"U.S. Appl. No. 12/434,492, Final Office Action mailed Mar. 8, 2012", 13 pgs.
"U.S. Appl. No. 12/434,492, Final Office Action mailed Apr. 29, 2013", 18 pgs.
"U.S. Appl. No. 12/434,492, Non Final Office Action mailed Aug. 19, 2011", 12 pgs.
"U.S. Appl. No. 12/434,492, Non Final Office Action mailed Oct. 2, 2012", 13 pgs.
"U.S. Appl. No. 12/434,492, Non-Final Office Action mailed Oct. 2, 2012", 13 pgs.

(Continued)

*Primary Examiner* — Mohammad W Reza
(74) *Attorney, Agent, or Firm* — Schwegman Lundberg & Woessner, P.A.

(57) ABSTRACT

Various embodiments include at least one of systems, methods, software, and data structures to evaluate function calls within a host, such as a scripting or application programming interface (API) host, prior to execution. Such embodiments may determine if a called function is authorized for execution. When the function is not authorized for execution, the function is not executed. Authorized and unauthorized functions may be set in a representation including one or both of authorized and unauthorized function functions. The representation may be stored external to the host so as to be modifiable.

18 Claims, 5 Drawing Sheets

(56) References Cited

OTHER PUBLICATIONS

"U.S. Appl. No. 12/434,492, Response filed Jan. 2, 2013 to Non-Final Office Action mailed Oct. 2, 2012", 12 pgs.
"U.S. Appl. No. 12/434,492, Response filed Jan. 2, 2013 to Non Final Office Action mailed Oct. 2, 2012", 12 pgs.
"U.S. Appl. No. 12/434,492, Response filed Jun. 8, 2012 to Final Office Action mailed Mar. 8, 2012", 11 pgs.
"U.S. Appl. No. 12/434,492, Examiner Interview Summary mailed Jun. 4, 2012", 3 pgs.
"Application Serial No. 2055.231US1, Response filed Nov. 21, 2011 to Non Final Office Action mailed Aug. 19, 2011", 9 pgs.

* cited by examiner

| FUNCTION | AUTHORIZED |
|---|---|
| Collab.collectEmailInfo() | YES |
| Collab.addAnnotStore() | NO |
| app.execDialog() | NO |
| app.beep() | NO |
| Util.printf() | YES |
| Bookmark.createChild() | NO |
| Annotation.setProps() | NO |
| ... | |

FIG. 4 — 400

| SOURCE | TRUSTED |
|---|---|
| SIG_ID1 | YES |
| SIG_ID2 | YES |
| SIG_ID3 | YES |
| SIG_ID4 | YES |
| SIG_ID5 | YES |
| SIG_ID6 | YES |
| SIG_ID7 | NO |
| SIG_ID8 | YES |
| SIG_ID9 | NO |
| ... | |

| FUNCTION | CONTEXT | AUTHORIZED |
|---|---|---|
| Collab.collectEmailInfo() | BATCH | YES |
| Collab.collectEmailInfo() | CONSOLE | YES |
| Collab.collectEmailInfo() | EMBEDDED | NO |
| Collab.collectEmailInfo() | APPLAUNCH | NO |
| Collab.addAnnotStore() | ANY | NO |
| app.execDialog() | ANY | NO |
| app.beep() | BATCH | NO |
| Util.printf() | ANY | YES |
| Bookmark.createChild() | BATCH | NO |
| Annotation.setProps() | CONSOLE | NO |
| ... | | |

SCRIPTING ENGINE EXTERNALIZED FUNCTION EXECUTION CONTROL

TECHNICAL FIELD

The subject matter herein relates to computer security and, more particularly, to scripting engine externalized function execution control.

BACKGROUND INFORMATION

Attacks against computing resources have become prevalent. New avenues of attack are being exploited at an increasing rate. Although many threats are quickly identified and remediated, some threats may not be resolved so quickly. Thus, in some circumstances, an attack may pose such a threat that the result is an inability to use an exposed system or application.

DETAILED DESCRIPTION

Various embodiments may include one or more of systems, methods, software, and data structures that provide an externalized representation of functions available in a scripting engine, Application Programming Interface (API), or other hardware or software element that may receive function calls. The externalized function representations provide the ability, in some embodiments, to enable and disable execution privileges at a function granularity within a portion of a hardware or software element that receives a function call, such as a scripting engine. The externalized function representations may be stored in a memory or storage device accessible when the determination of whether or not to allow a called function to execute is made, such as by a scripting engine. Through use of such embodiments, individuals, enterprises, and other users may easily and rapidly adjust execution capabilities of functions for purposes such as reducing exposure to potential or existing vulnerabilities. Such execution capability adjustments may be made with regard to specific functions that may be identified in periodic security bulletins rather than disabling an entire scripting host to reduce exposure.

Figure 1:
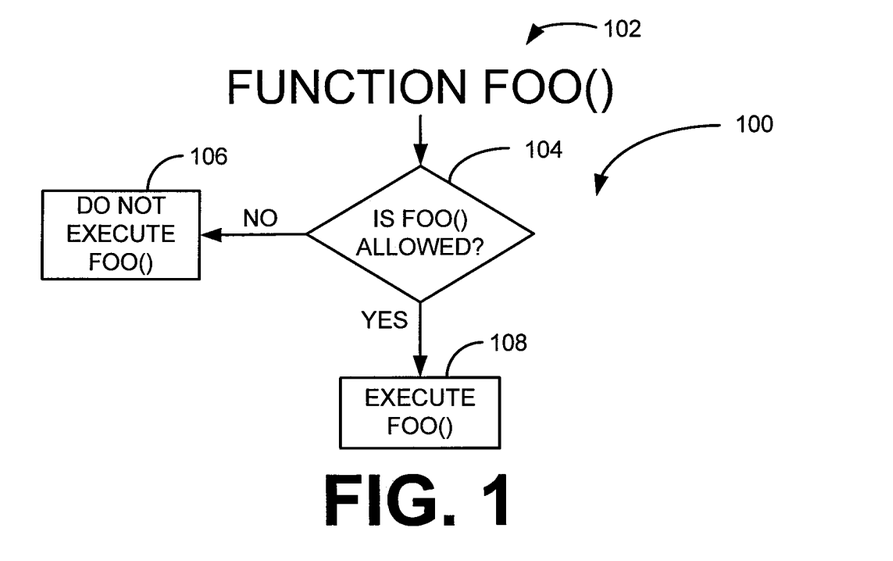
FIG. 1 is a block flow diagram of a method according to an example embodiment.

FIG. 1 is a block flow diagram of a method 100 according to an example embodiment. The method 100 includes a function call 102 of a function named "foo( )" which may be called to perform a certain task. A "function," as used herein, refers to a set of instructions that performs a specific task when executed. Examples of functions include a beep function that can be called to produce a beep sound, a print function that can be called to print a document, a save function that can be called to save a document, and a variety of other functions. It should be appreciated that a function may also be referred to as a program, subroutine, procedure, or routine, and therefore, such terms may be used interchangeably. The function may be compiled resulting from an output of a compiler where the set of instructions is in machine language or other assembly language program. Alternatively, the function may be directly interpreted by an interpreter, such as a scripting host, where the set of instructions is in scripting language or in extension language. The function may be exposed or made available for execution by way of, for example, a dynamic link library, an API, or other similar mechanisms. An API function exposed by way of the API may be referred to as an "API function."

In the example embodiment of method 100, when the function call 102 is received by a host that is to execute, or otherwise cause the function to be executed, the host performs a validation procedure prior to executing the function call 102. To perform this validation procedure, the host determines 104 if the function call is allowed. The determination, in some embodiments, includes retrieving, or otherwise obtaining, a privilege indicator with regard to the received function call 102. The privilege indicator may be retrieved from a source external to the host, such as a configuration setting data structure which may include one or more of a registry, a configuration file, or other repository of configuration settings. In other embodiments, the privilege indicator may be included within the host. The privilege indicator is then used by the host to perform the determination 104. If the function call 102 is not allowed, the host does not execute 106 the function and continues to a next function or otherwise proceeds in execution. If the function call 102 is determined 104 to be allowed, the function is executed 108.

In some embodiments, the determination 104 of whether or not the function call is allowed may consider additional information. Such additional information may include a context from which the function call 102 is received, such as in a batch processing context, a command line context, a context where the function call is embedded within a script or compiled application, and other context from which the function call 102 may be received. The additional information may also, or alternatively, include a digital signature, user ID, or other authentication information that may be received with or obtained within a computing system with regard to the function call 102. In such embodiments, the authentication information may be used to set permission profiles that may allow certain users, devices, or applications to make the function call 102 while other users, devices, or applications may not be allowed.

Figure 2:
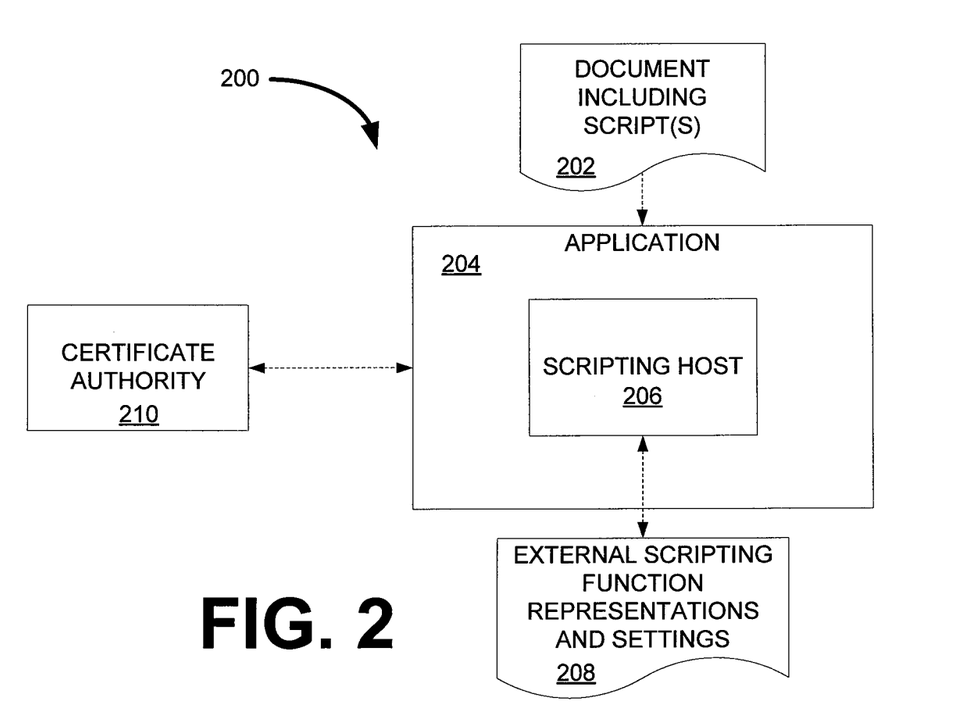
FIG. 2 is a block diagram of a system according to an example embodiment.

FIG. 2 is a block diagram of a system 200 according to an example embodiment. The example system 200 includes an application 204 with a scripting host 206 therein that is operable to execute scripts received into the application 204. In some embodiments, the scripting host 206 may be a JavaScript scripting host that is operable to receive and execute scripts in a format of the JavaScripting language. However, the scripting host 206 may accept and execute other scripting languages depending on the particular embodiment. In other embodiments, the scripting host 206 may be an API of the application that receives API calls instead of scripts.

The application 204, in some embodiments, may be the ADOBE ACROBAT® application or the ADOBE READER® application developed by ADOBE SYSTEMS INCORPORATED of San Jose, Calif. However, in other embodiments, the application 204 may be a web browser application, a page authoring or reading application, a spreadsheet application, or other application that may include a scripting host 206 or API that is capable of receiving function calls from a data item, such as a document, consumed by the application or from another source. In other embodiments, the application 204 may be an operating system with a scripting host 206 included therein or added on through a plug-in or other software that may be installed to augment the functionality and or services of the operating system.

The application 204 is operable to receive a document 202 including scripts. The application 204 consumes the document 202, such as by generating a view based on at least a portion of content included in the document. One or more scripts within the document 202, when encountered or triggered within the application, are forwarded as function calls to the scripting host 206. The scripting host 206 receives the function calls and performs a validation for each function to validate that the respective individual functions are authorized for execution.

The scripting host 206, in some embodiments, upon receipt of a function call may perform the method 100 of FIG. 1. This may include retrieving a privilege indicator from a repository 208 of external scripting function representations and settings. The retrieving may include retrieving a single indicator based on the individual function being evaluated by the scripting host prior to execution of the function. The retrieving may instead include loading the repository 208 into a memory upon instantiation of the scripting host 206 and reading directly from the memory. In some embodiments, the repository 208 may be one or more tables in a database, one or more files stored on a storage device upon which the application 204 executes, data stored on a remote data storage device accessible over a network, or other storage location and mechanism.

In some embodiments, the document 202 including the scripts may be a signed document including a digital signature issued by a certificate authority 210. In such embodiments, the scripting host 206 may submit a verification request to the certificate authority 210 to receive an indication back as to the veracity of the digital signature. If the signature is valid, the function may be allowed to execute. In other embodiments, the repository may include function privilege information at the granularity of a digital signature, such as by a digital signature alone or a digital signature in combination with one or more other data elements. The one or more other data elements may include a function, a context from which the function was called, an application from which the function was called, a time of day, and other data elements.

In other embodiments, a user identifier (user ID) may be used instead of or in combination with a digital signature and the user ID may be verified, at least in part, through conventional user ID and password mechanisms. For example, the document 202 may be signed with a digital signature and be accessed by a particular user with a user ID. The repository 208 may include data indicating the user, according to the user ID, is allowed performance of a certain function. The scripting host may receive a function call from a document script while the user is viewing a document signed with a digital signature. The scripting host may first submit a verification request to the certificate authority 210. A response from the certificate authority 210 will be received. If authorized, the scripting host may then retrieve one or more privilege indicators from the repository 208 based on two or more of the digital signature, the user ID, the function called, and the context from which the function is called (i.e., from within the application while viewing the document 202).

The external scripting function representations and settings stored in the repository 208 may be modified by a human user or by a logical user, such as an updating program or process that retrieves or receives (e.g., pushed) function representations and settings from a remote location. The human user may be a system administrator or other human user. The logical user may retrieve or receive updates on a scheduled periodic basis, upon startup of the application 204, upon occurrence of an event defined within the application, or at one or more of these or other times. Modification of the external scripting function representations and settings stored in the repository is performed to disable and enable specific functions for execution. Disabled functions are not allowed to execute within the scripting host 206.

Through the setting of function-level execution privileges, functions that are found or otherwise believed to be exploitable for nefarious purposes can be disabled. However, some embodiments also provide control mechanisms to control execution of functions that may be exploitable only under certain circumstances, such as when a function may be exploitable in one context but not others. For example, calls of an exploitable function from a particular exploitable context can be prevented while still allowing the exploitable function to be called from non-exploitable contexts or contexts where the function is unlikely to be exploited. Further, some embodiments also provide control mechanisms where function calls from, or flowing from, documents signed by trusted sources or accessed by trusted user may be executed while function calls from non-trusted sources or users are not allowed.

As briefly mentioned above, the function representations and authorization settings 208 may be embedded within the scripting host 206. However, in other embodiments, the function representations and settings 208 may be externalized from the scripting host 206, thereby allowing for easy and quick modification of the function representations and settings 208.

Figure 3:
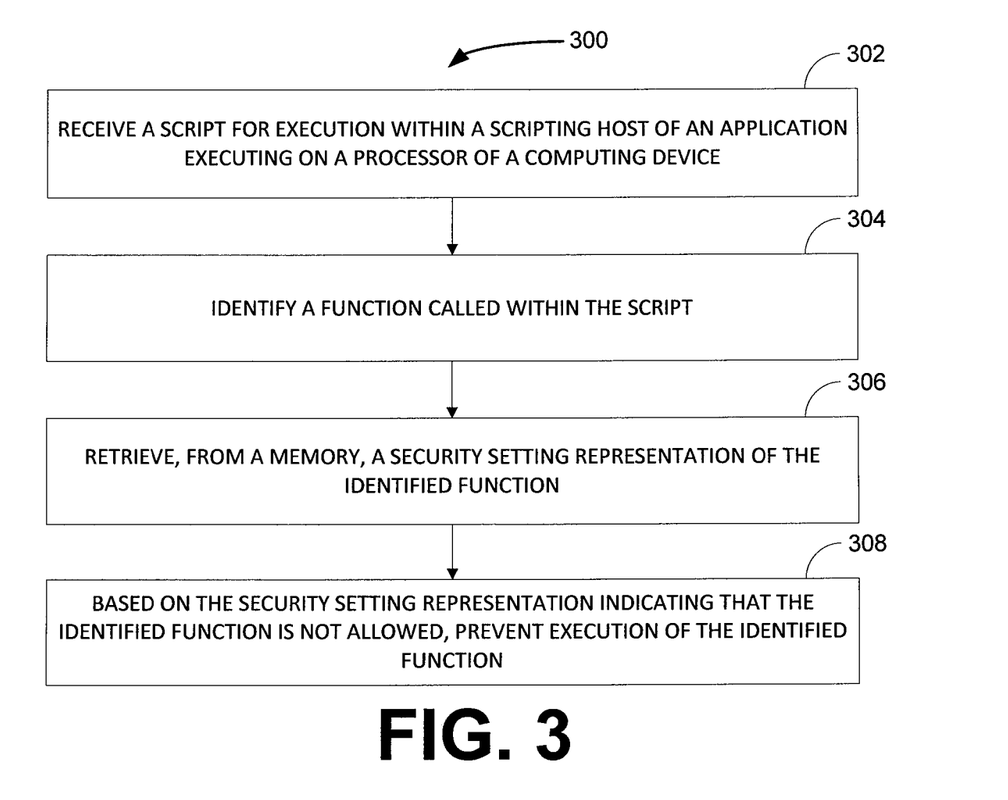
FIG. 3 is a block flow diagram of a method according to an example embodiment.

FIG. 3 is a block flow diagram of a method 300 according to an example embodiment. The method 300 is an example of a method that may be performed by a scripting host of an application, such as an application that may consume content such as a web browser or a document reading application that may also include document authoring functionality. In other embodiments, the method 300 may be an API host of an application that receives API calls and causes execution of such calls.

The example method 300, as illustrated, includes receiving 302 a script for execution within a scripting host of an application executing on a processor of a computing device and identifying 304 a function called within the received 302 script. The method 300 further includes retrieving 306, from a memory, a security setting representation of the identified 304 function and, based on the retrieved security setting representation indicating that the identified function is not allowed, preventing 308 execution of the identified 304 function. Preventing 308 execution of the identified 304 function may include returning an exception in the received 302 script or halting further execution of the received 302 script entirely. In other embodiments, preventing 308 execution of the identified 304 function may cause virtual execution of the identified 304 function. For example, the scripting host may commonly receive certain function calls that provide a predictable return or other result or action. In such instances, the scripting host may provide the predictable return or other result or action without executing the identified 304 function.

In some embodiments, the security setting representation includes an entry for at least one scripting host function to be prevented 308 from executing. The security setting representation typically includes data stored in a data structure holding configuration data for the computing device. Examples of such data structures are illustrated and described herein with regard to FIGS. 4, 5, and 6. In one embodiment, the data structure is a registry of an operating system executable on the computing device. In other embodiments, the data structure may include one or more files, tables, or network accessible resources. The data may be stored in a textual form, such as in eXtensible Markup Language (XML) documents or character columns of database tables. In other embodiments, the data may be stored as binary representations.

In some embodiments, the method 300 may further include identifying a context from which the identified 304 function is called within the script. Such contexts may include the calling of the function from within content, such as a document, retrieved from a local storage location such as a hard disk, or from a trusted or non-trusted network location, such as a web site. The context may also be the calling of the function from a command line or scripting console of the application or from a batch program that utilizes the scripting host of the application. In such embodiments of the method 300, the retrieving 306 of the security setting representation of the identified function 304 may include retrieving 306 the representation as a function of the identified context and the identified 304 function.

Some embodiments of the method 300 may also include evaluating, within the scripting host, a document including the script to identify a source of the document, such as a particular storage location or universal resource identifier (URI) such as a universal resource locator (URL) from which the document was retrieved or received. The source may be identified by the application, metadata of the document, a digital signature or other security data included within or referenced by the document, as specified by a human user, or otherwise known or determined by the application or scripting host. Some such sources may be known as trusted sources. Trusted sources may be sources identified within an organization, by a trusted third party, specified by a user, or otherwise known. The scripting host or the application may include functionality to determine if the source of the document is trusted based on such known trusted sources, such as by querying a local or remote trusted source service or data store. In some such embodiments, when the source of the document is a trusted source, the method 300 may include executing all scripts in the document without retrieving the security setting representation of the identified function.

Figure 4:
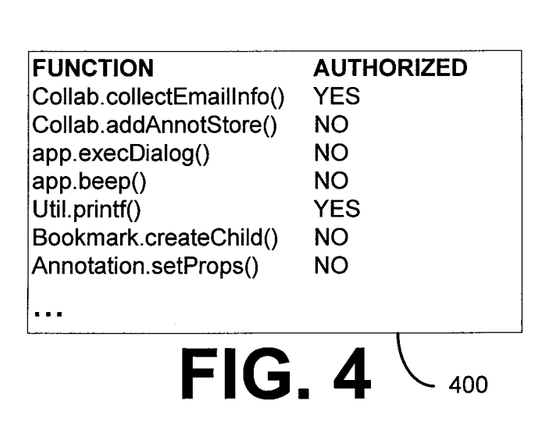
FIG. 4 is a data structure illustration according to an example embodiment.

FIG. 4 is a data structure 400 illustration according to an example embodiment. The data structure 400 holds data including security setting representations of functions of a scripting host, API host, or other similar host where function calls may be directed by applications and other processes. The data structure 400 includes two columns. The first column identifies some or all functions that may be called in the respective host. The second column includes a Boolean value or other value type that conveys to the respective host whether or not the corresponding function is authorized for execution.

Figure 5:
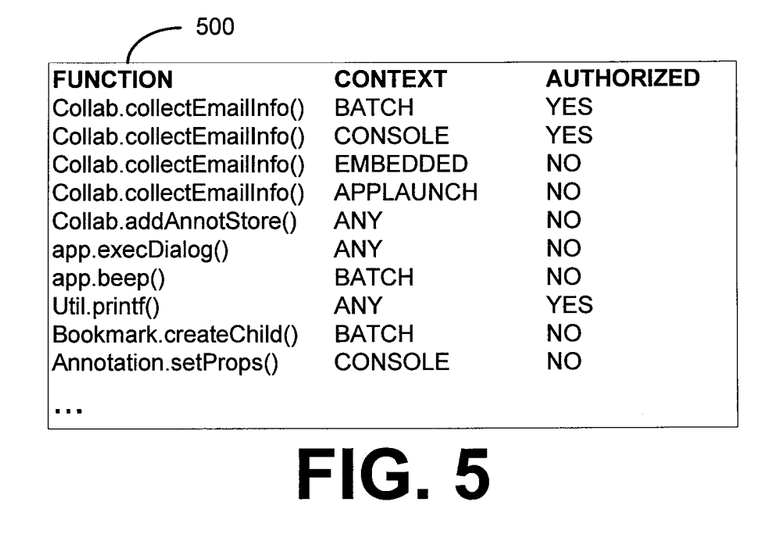
FIG. 5 is a data structure illustration according to an example embodiment.

FIG. 5 is a data structure 500 illustration according to an example embodiment. The data structure 500 holds data including security setting representations of functions of a scripting host at a contextual granularity from which respective functions may be called. The columns of data include a function column that identifies a function, a context column that identifies a context from which the function may be called, and an authorized column designating if the function may be executed when called from the particular context identified in the context column.

Figure 6:
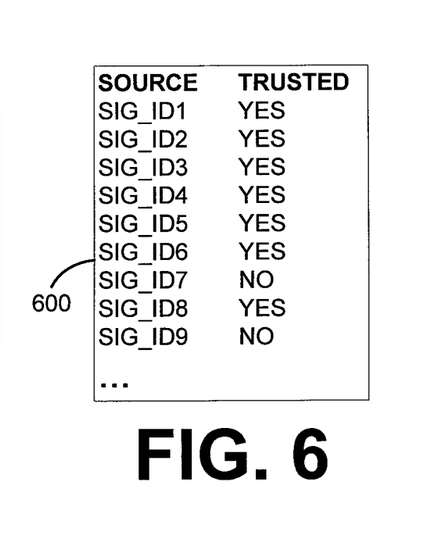
FIG. 6 is a data structure illustration according to an example embodiment.

FIG. 6 is a data structure 600 illustration according to an example embodiment. The data structure 600 identifies trusted an untrusted sources as may be identified by digital signatures or other data that may be included in a document or other data from which a function call is made.

The data structures 400, 500, 600 of FIGS. 4, 5, and 6 include data that may be accessed by a scripting host when performing one or more of the embodiments described herein. Although the data structures 400, 500, 600 of FIGS. 4, 5, and 6 are illustrated and described in a table-like manner, the data may be stored in other manners depending on the particular embodiment. The data structures 400, 500, 600 of FIGS. 4, 5, and 6 may individually be stored locally on a computing device upon which the respective host executes or one or more other locations. Such other locations may include database servers, file servers, or other data storage locations that may be accessible by a computing device upon which the respective host executes.

Figure 7:
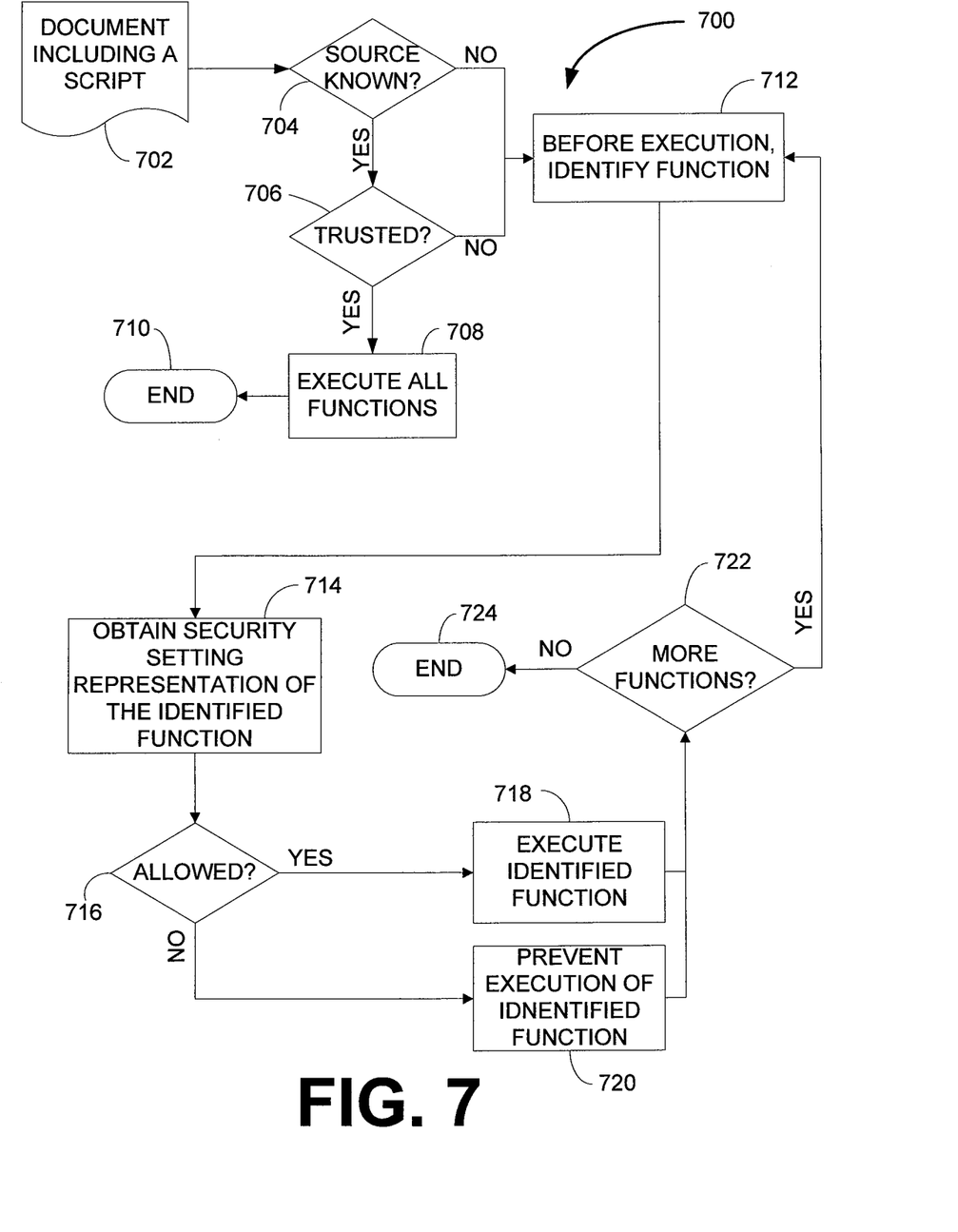
FIG. 7 is a block flow diagram of a method according to an example embodiment.

FIG. 7 is a block flow diagram of a method 700 according to an example embodiment. The method 700 is another example embodiment that includes determining if execution of called function is allowed within a host, such as a scripting host or API host, as indicated in one or more sets of configuration settings. The method 700 includes receiving a document 702 including a script. The method 700 may first determine 704 if the source of the document 702 is known. If the source is known, another determination 706 is made to determine if the source is trusted. The source of the document may be determined 704 based on where the document 702 was received or retrieved from, data included within the document 702 such as metadata, a digital signature, or other source identifying data. The determination 706 if the source is trusted may include evaluating the determined 704 document 702 source in view of rules encoded in the host, based on data retrieved from a local or remote data source, through a web service or other service accessible over a network, or through other mechanisms depending on the particular embodiment. If the source is determined 706 to be trusted, the method 700 includes executing 708 all functions of the script included in the document 702 and ending 710 execution of the method 700.

In cases where the determined 704 source is unknown or the source is determined 706 to be an untrusted source, the method 700 include identifying 712 functions of the script before execution. For each identified 712 function, the method 700 obtains 714 a security setting representation, such as from one of the data structures 400, 500 illustrated in FIG. 4 or FIG. 5. Based on the obtained 714 security setting representation, a determination 716 is made if the identified 712 function should be allowed to execute. If the identified 712 function is allowed, the function is executed 718. If the function is not allowed, the function is prevented 720 from executing. In either case, the method 700 then determines 722 if further functions remain in the script of the document 702 for execution consideration. When further functions do exist in the script, the method returns to indentifying 712 the next function and proceeds through the method 700 accordingly. When there are no further functions in the script of the document 702, execution of the method 700 ends 724.

Figure 8:
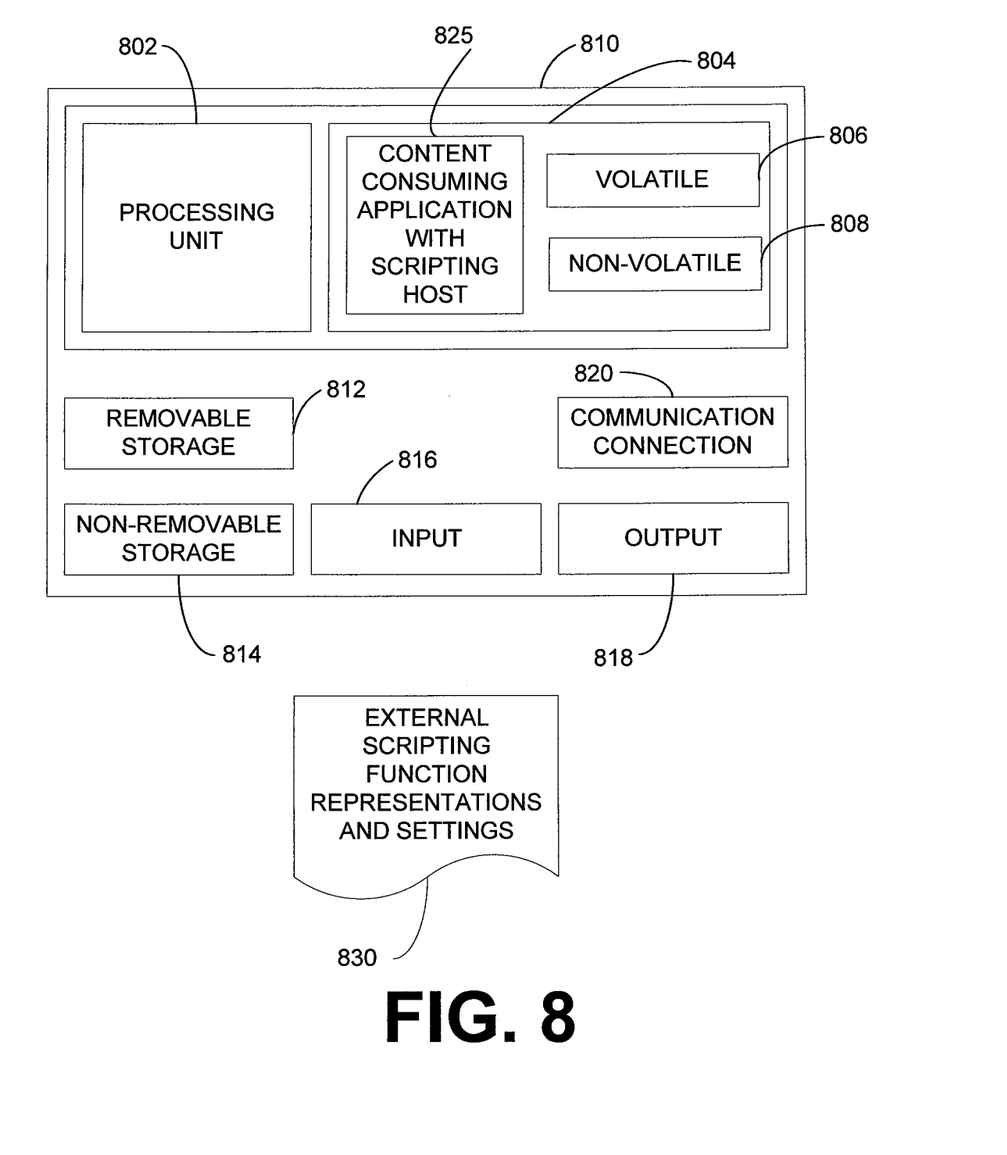
FIG. 8 is a block diagram of a computing device according to an example embodiment.

FIG. 8 is a block diagram of a computing device according to an example embodiment. In one embodiment, multiple such computer systems are utilized in a distributed network to implement multiple components in a transaction-based environment. An object oriented, service oriented, or other architecture may be used to implement such functions and communicate between the multiple systems and components. One example computing device in the form of a computer 810 may include one or more processing units 802, memory 804, removable storage 812, and non-removable storage 814.

Memory 804 may include volatile memory 806 and non-volatile memory 808. Computer 810 may include—or have access to a computing environment that includes—a variety of machine-readable media, such as volatile memory 806 and non-volatile memory 808, removable storage 812 and non-removable storage 814. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing machine-readable instructions. Computer 810 may include or have access to a computing environment that includes input 816, output 818, and a communication connection 820. The computer may operate in a networked environment using a communication connection to connect to one or more remote computers, such as database servers. The remote computer may include a personal computer (PC), server, router, network PC, a peer device or other common network node, or the like. The communication connection may include one or more of a Local Area Network (LAN), a Wide Area Network (WAN), the Internet, and other networks.

Machine-readable instructions stored on a machine-readable medium are executable by the one or more processing units 802 of the computer 810. A hard drive, CD-ROM, DVD-ROM, and RAM are some examples of articles including a machine-readable medium. For example, a content consuming application 825 with a scripting host capable of preventing execution of individual function calls included within a document or other content according external scripting function representation and settings included within a data structure 830. The data structure 830 may be stored in one or more of the memory 804, non-removable storage 814, removable storage 812, other memories and storage device of the computer 810 that are not illustrated, at a location accessible via the communication connection 820, or other location.

One example embodiment in the form of a machine-readable storage medium, such as non-removable storage 814 or removable storage 812 includes instructions stored thereon. When the instructions are executed by the one or more processing units 802, the instructions cause the computer 810 to receive a document in a computing application, such as the content consuming application 825. The received document may include a script that is executable by a scripting host of the computing application. The instructions may further cause the computer to identify a source of the document and when the source is determined to be either unknown or known, but not from a trusted source, function calls of the script are then evaluated prior to execution within the scripting host. Such evaluation may be performed by identifying a function called and obtaining a security setting representation of the identified function. When the obtained security setting representation indicates the identified function is not allowed, execution of the identified function is prevented.

In some such embodiments, obtaining the security setting representation of the identified function includes passing an identifier of the identified function to an object, which may be local to the computer or remote, and receiving, from the object, an indication of whether to allow the function to be executed. Another example embodiment is in the form of a system. The system in such embodiments includes at least one processor and at least one memory device coupled to a bus. The memory device holds a document including a script. The system further includes an application with a scripting host for processing of scripts included in documents or other data consumed by the application. The application may be held in the memory device(s) or other memory or storage device of the system. The application is executable by the processor(s) to extract scripts included within a document and provide those scripts to the scripting host as directed by the document and scripts within the document. The scripting host may then identify a function called within the script prior to execution of the function and retrieve, from the memory device(s), a security setting representation of the identified function. When the retrieved security setting representation indicates the identified function is not allowed, the scripting host prevents execution of the identified function.

Another embodiment in the form of a method includes retrieving, from a computer-readable storage medium, and executing instructions on a computing platform to retrieve security settings of functions callable within a scripting host, the computing platform including at least one processor to execute the instructions. The method further includes retrieving, from the computer-readable storage medium, and executing instructions on the computing platform to capture scripting host function calls prior to execution by the scripting host. Based on the retrieved security setting representation indicting that the captured function is not allowed, executing instructions on the computing platform to prevent execution of the captured function. In instances where there is no security setting representation for a captured function, a default setting may apply. Such as default setting specifies how to handle such unrepresented for functions. For example, the default setting may specify to allow function execution or prevent function execution. In the above description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. The following description is, therefore, not to be taken in a limited sense, and the scope of the inventive subject matter is defined by the appended claims.

Numerous specific details are set forth herein to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter. Some portions of the description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this description, discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Thus, the functions or algorithms described herein are implemented in hardware, software, or a combination of software and hardware in one embodiment. The software comprises computer executable instructions stored on computer readable media such as memory or other type of storage devices. Further, described functions, methods, and elements thereof may correspond to modules, which may be software, hardware, firmware, or any combination thereof. Multiple functions are performed in one or more modules as desired, and the embodiments described are merely examples. For example, the method 300 of FIG. 3 may include one or more modules that operate in conjunction with one another to implement the method in a system. In an example system, there is a receiving module to receive 302 scripts, an identification module to identify 304 functions called within scripts received by the receiving module, and a retrieving module to retrieve 306 a security setting representation of a function identified by the identification module. An execution module is also included in some such embodiments that is operable to either allow or prevent execution of an indentified function by a scripting host based on a retrieved security setting representation retrieved by the retrieving module for a function identified by the identification module.

The software, which may be in the form of a software module, is executed on a digital signal processor, ASIC, microprocessor, or other type of processor operating on a system, such as a personal computer, server, a router, or other device capable of processing data including network interconnection devices. Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:
   receiving a script for execution within a scripting host of an application executing on a processor of a computing device;
   identifying, by the scripting host, a function called within the script and a context from which the identified function is called;
   retrieving by the scripting host, from a memory, a security setting representation of the identified function based at least in part on the context from which the identified function is called; and
   the scripting host, based on the security setting representation indicating that the identified function is not allowed in the context from which the identified function is called, preventing execution of the identified function in the context from which the identified function was called.

2. The method of claim 1, wherein the security setting representation includes an entry for each individual scripting host function to be prevented from executing.

3. The method of claim 1, wherein the security setting representation includes data stored in a data structure holding configuration data for the computing device.

4. The method of claim 3, wherein the data structure is a registry of an operating system executable on the computing device.

5. The method of claim 1, wherein the identified context from which the identified function is called is from a script included within a document consumed by an application including the scripting host.

6. The method of claim 1, further comprising:
   evaluating, within the scripting host, a document including the script to identify a source of the document; and
   based on the source of the document being a trusted source, executing all scripts in the document without retrieving the security setting representation of the identified function.

7. A non-transitory machine-readable storage medium, with instructions stored thereon, which when executed by at least one processor of a computing device, cause the computing device to:
   receive a document in a computing application, the document including a script that is executable by a scripting host of the computing application;
   identifying by the scripting host a source of the document and, based on the source being either unknown or known, but not from a trusted source, evaluating script function calls prior to execution of the functions within the scripting host by:
      identifying a function called within the script and a context from which the identified function is called;
      obtaining a security setting representation of the identified function in the context from which the identified function is called; and
      based on the security setting representation indicating that the identified function is not allowed in the context from which the identified function is called, preventing execution of the identified function in the context from which the identified function was called.

8. The non-transitory machine-readable medium of claim 7, wherein the obtaining of the security setting representation of the identified function includes:
   passing an identifier of the identified function to an object; and
   receiving, from the object, an indication of whether to allow the function to be executed.

9. The non-transitory machine-readable medium of claim 7, wherein the obtaining of the security setting representation of the identified function includes:
   retrieving, from an application configuration file stored in a memory of the computing device, a security setting representation of the identified function.

10. The non-transitory machine-readable medium of claim 7, wherein the identifying of the source of the document includes processing a digital signature of the document to verify the document is signed by a trusted source.

11. The non-transitory machine-readable medium of claim 7, wherein the security setting representation includes an entry fir at least one scripting host function to be prevented from executing.

12. A system comprising:
   at least one processor coupled to a bus;
   at least one memory device coupled to the bus;
   a document held in the at least one memory device, the document including a script;
   an application including a scripting host to process of scripts included in documents consumed by the application, the application held in the at least one memory device and executable by the at least one processor to:
      extract scripts included within a document and provide the extracted scripts to the scripting host as directed by the document;
      identify, by the scripting host, a function called within the extracted scripts prior to execution of the function and a context from which the identified function is called within the extracted scripts;
      retrieving by the scripting host, from the at least one memory device, a security setting representation of the identified function based at least in part on the context from which the identified function is called within the extracted scripts; and
      the scripting host, based on the security setting representation indicating that the identified function is not allowed in the context from which the identified function is called within the extracted scripts, preventing execution of the identified function in the context from which the identified function is called within the extracted scripts within the scripting host and upon the at least one processor.

13. The system of claim 12, wherein the security setting representation includes an entry for at least one scripting host function to be prevented from executing.

14. The system of claim 12, wherein the security setting representation includes data stored in a data structure holding configuration data for the computing device.

15. The system of claim 14, wherein the data structure is a registry of an operating system executable by the at least one processor of the system.

16. The system of claim 12, wherein the identified context from which the identified function is called is from a script included within the document.

17. The system of claim 12, wherein the application is further executable to:
   evaluate the document to identify a source of the document; and
   based on the source of the document being a trusted source, executing all scripts in the document without retrieving the security setting representation of the identified function.

18. A method comprising:
   retrieving, from a computer-readable storage medium, and executing instructions on a computing platform to retrieve security settings of functions callable within a scripting host, the computing platform including at least one processor to execute the instructions;
   retrieving by the scripting host, from the computer-readable storage medium, and executing instructions on the computing platform to capture a scripting host function call prior to execution by the scripting host and a context within which the captured scripting host function call is made; and
   the scripting host, based on the retrieved security setting representation indicting that the captured scripting host function call is not allowed in the context within which the captured scripting host function call is made, executing instructions on the computing platform to prevent execution of the captured scripting host function in the context from which the captured scripting host function was called.

* * * * *